3,059,348
METHOD AND APPARATUS FOR
TEACHING LANGUAGES
Antonio Libero Mezzacappa, 100 Wildwood St.,
Winchester, Mass.
Filed Dec. 21, 1959, Ser. No. 861,036
4 Claims. (Cl. 35—35)

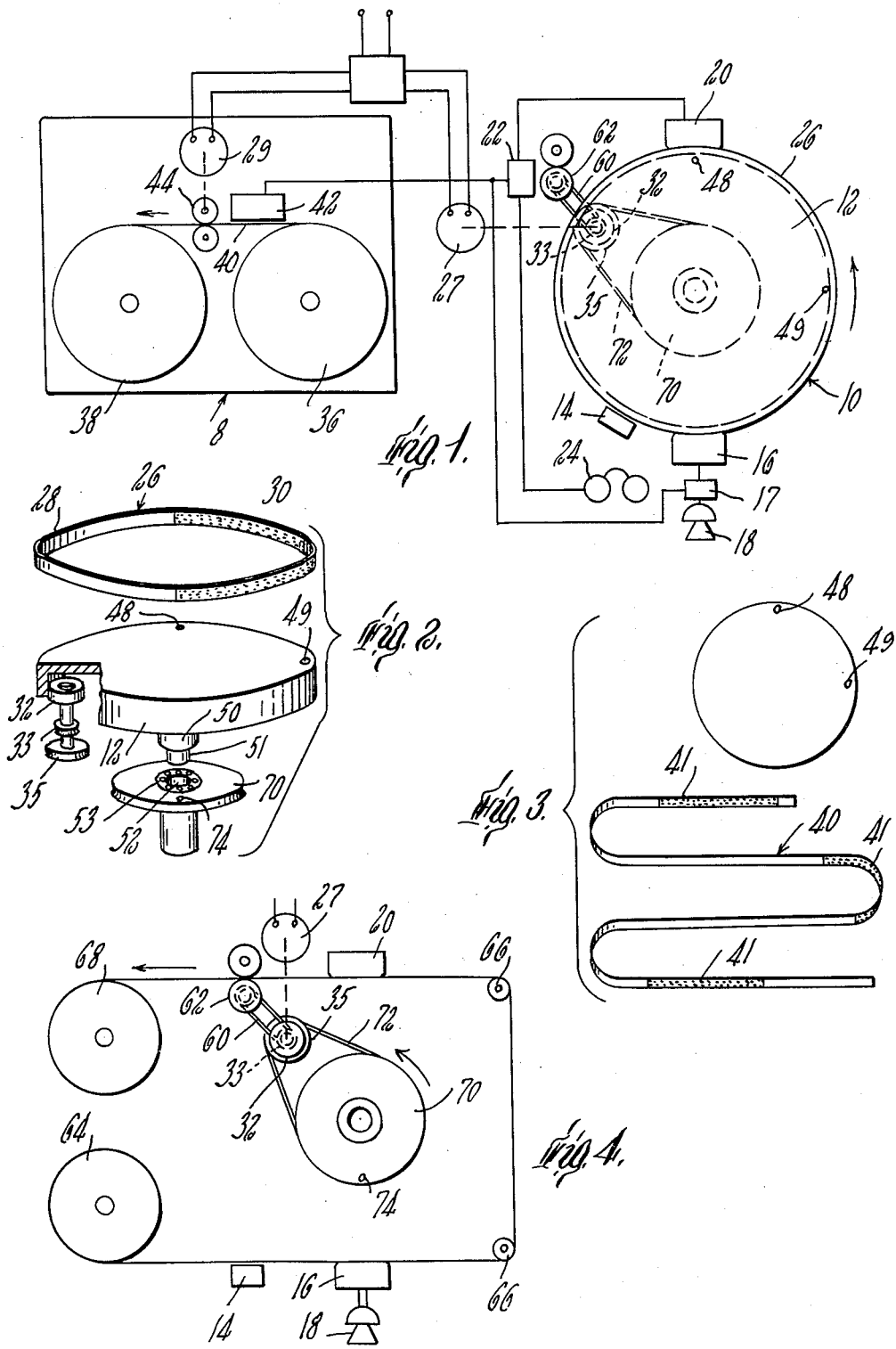

This invention relates to teaching foreign languages.

In language laboratories the student has been placed before a tape recorder, and upon hearing a master pronunciation of a foreign word or group of words forming a sentence the student repeats what he has heard, the two being recorded in sequence on the student tape. This has been continued until the tape is filled, and then the student, after rewinding the entire tape, can play it back to compare his articulation with the master, thus gaining an insight into his deficiencies in pronunciation, inflection and emphasis.

I have realized that although the above procedure is beneficial, the time delay involved between the student's actual struggling with the problem of speaking the words, and in hearing the subsequent comparison on the playback is a disadvantage.

To remedy this, I have invented the method of having a student repeat after a master a foreign word or group of words and then immediately subsequently, hear again the master statement and his own repetition for comparison, followed by subsequent listen-repeat-playback cycles for successive master statements.

The entire process of cyclically listening, reciting and immediately playing back for comparison can be conducted without the presence of a teacher, with a large number of students simultaneously repeating after a single master source at individual student stations. With the novel apparatus I have invented all can be accomplished in exact synchronism without the student having to push buttons or otherwise adjust the machine. The master voice is provided on a master recording which is synchronized with a student magnetic tape. This master recording has equal length portions filled with master articulation, separated by lengths three times as long filled with silence.

The student recording and playback apparatus utilizes a short endless tape length which I anticipate will find wide application in language laboratories where expense is of concern. This apparatus is also adaptable for utilizing the normal reeled tape when desired.

Other features of my invention will be apparent from the following detailed description taken in conjunction with the accompanying drawings wherein:

FIG. 1 is a schematic plan view of a preferred embodiment of the apparatus using a short endless tape at the student station;

FIG. 2 is an exploded perspective of the tape portion of the apparatus;

FIG. 3 is a schematic indication of a master recording and its relation to a student tape; and FIG. 4 is a plan view of the embodiment of FIG. 1 adapted for use of a reeled tape.

Preferred embodiments of my apparatus comprise a student station including a cylinder with an endless loop of recording tape held on its periphery, and playback, eraser and recorder means. In my presently preferred embodiment the playback means is spaced diametrically across the cylinder from the recorder means and sensitive tape extends only around one-half of the loop. As the sensitive tape portion begins to pass by the recorder means, the master statement is received and recorded while the student listens to it; half-way through this sensitive tape the master passage ends and the student repeats and is recorded to the end of the semi-circle of sensitive tape. As soon as the end of the sensitive portion reaches the recorder means the playback means picks up the master voice recorded on the student tape followed by the student recording which the student hears. Then the sensitive tape, meanwhile erased, comes by the recorder means again, and the next cycle begins with a second master statement. This preferred student station, it will be noted, involves no complicated switching whatsoever, and only one moving element.

Following the method outlined above, it is, of course, possible to use a single electromagnetic device for both recording and playback, provided with a cyclical switch for selection of circuitry.

For language laboratory use, this student station is synchronized with a master station carrying on the first quarter of each cycle a master recording and the following three-quarters of silence. This is played to the student and to his machine.

Referring now to the figures, I provide a master station 8 and a student station 10. At the student station there is a large rotatably mounted tape cylinder 12 adapted to be surrounded by a student recording tape 26. At one point along the periphery of the cylinder there is an eraser 14 and a recorder means 16 connected to a microphone 18. Diametrically opposed from this recorder means, adjacent the periphery of the cylinder, there is a pick-up 20. A cylinder drive means 32 engages the inner surface of the cylinder. This drive wheel is synchronized in movement with the recording at the master station to be hereafter described, so that the operation of the two stations will be in phase.

The master station embodiment for tape recordings comprises storage and take-up reels, 36 and 38 respectively, between which a master tape 40 is wound engaging a pick-up 42.

The outputs from the student pick-up 20 and from the master pick-up 42 are each directed to a mixer-amplifier 22 and from there into earphones 24 or a speaker at the student station. The outputs from the master pick-up 42 and from the microphone 18 are each directed to a mixer-amplifier 17, the output of which is fed to the recorder means 16.

The cylinder drive means 32 at the student station is driven directly by a synchronous motor 27. The master tape is driven by a tape drive 44 powered by a synchronous motor 29. Synchronization of student and master stations is accomplished by the synchronous motors connected to the same power supply.

Referring to FIG. 2 the student tape 26 is comprised of a non-sensitive semi-circular tape portion 28 and a magnetic sensitive semi-circular tape portion 30 joined into an endless loop which may easily be placed around the cylinder 12. Sufficient tension in the tape is provided to ensure driving contact with the cylinder 12. An indicator 48 is affixed to the cylinder to indicate the beginning of the magnetic sensitive tape with relation to the recorder. A different colored indicator 49 is spaced 90° behind indicator 48 to indicate the mid-portion of the sensitive tape at which point the student should begin reciting. The tape cylinder 12 is provided with a hub 50 and a shaft 51. The cylinder is rotatably mounted by insertion of the shaft into a stationary socket 52, with the hub 50 resting upon bearings 53 for support. Disc 70, hereinafter more fully described, is mounted for independent rotation.

Referring to FIG. 3 the master tape 40 is diagrammatically shown divided into equal segments with every fourth segment 41 having recorded thereupon a master passage to be listened to by the student and repeated and the intervening three segments being silent. This tape is to be played in synchronization with the student mechanism so that it is heard by the student and recorded upon the student tape between indicators 48 and 49. Where equal tape speeds are employed at master and student stations, the student cylinder has a circumference equal to the length of four segments of the master tape.

The operation of the apparatus is as follows: The indicator 48 is aligned with the recorder 16 and the master station is adjusted so that the beginning of a master passage 41 is aligned with the master pick-up 42. The apparatus is energized and the student hears the master passage being played back at e.g. 3.75 in./sec. while it is recorded on the student tape between indicators 48 and 49, as that tape passes under the recorder 16, e.g. at 3.75 in./sec. When indicator 49 comes into alignment with the recorder, which may be, for example, after 5 seconds, if the semi-circle sensitive tape portion is 37.5 inches in length (and the cylinder periphery is 75 inches), the student knows that he is to begin speaking, and he repeats the passage attempting to duplicate the master. As soon as all of the magnetically sensitive tape passes under the recorder, e.g. 10 seconds at 3.75 in./sec. or 37.5 inches, the first portion of the sensitive tape begins to pass under the pick-up 20 and first the master and then the student voice is played back during the next 10 seconds. The microphone remains energized but does not record because the tape thereunder is not sensitive. (Similarly, when the sensitive tape is passing under the recorder, the pick-up 20 remains energized but picks up no signal. The master pick-up 42, although energized throughout, picks up sound only when the recorded segments 41 pass thereunder.)

After the last of the student recording is heard, the sensitive portion of the student tape again arrives at the recorder where it is erased by eraser 14 and it receives another master passage from the master station and the cycle is repeated.

Referring to FIG. 4, portions of the apparatus of FIG. 1 are adapted to employ a reeled tape for cyclical operation as above. Here the tape cylinder 12 with its hub 50 and shaft 51 has been removed, exposing disc 70 to view. A pulley 33 mounted on the same shaft as cylinder driver 32 drives a tape drive roller 62 at a 1:1 ratio through a timing belt 60. A magnetic tape is led from a storage reel 64, by the eraser 14 and recorder means 16, and then over a number of idler posts 66 to the pick-up head 20, into driving contact with drive roller 62 and thence to take-up reel 68. The storage and take-up reels are provided with ordinary slipping-tension devices to maintain appropriate tension in the tape.

The rotatable disc 70 is driven by a timing belt 72 by a drive pulley 35. This disc carries a signal indicator 74 and its circumference and that of the pulley 33 is such that the signal indicator makes a complete revolution for each cycle of the listen-repeat-playback cycle, and is so synchronized with the master tape as to indicate to the student the instant during each cycle when he should begin speaking. With appropriate spacing of a number of the idler posts a substantial amount of tape may be interposed between recorder and playback heads, and correspondingly long master passages and student repetitions are achieved.

A further modification of the invention is the provision of the master tape directly at the student station where an individual and not a class exercise is conducted. It should be apparent that the obvious equivalents for the elements I have utilized may equally be conjoined within the teachings of my invention.

What I claim is:

1. A teaching apparatus for use by a student comprising means for moving a tape member through an extended path at a predetermined constant speed, a recording means adapted to record statements and a play-back means including a pick-up member spaced along said tape path at a substantial distance in the direction of tape movement, said pick-up member and said recording means adapted to be continuously energized and said tape member comprised of successive segments of sensitive record material and non-sensitive material, each having a length substantially corresponding to the path distance between said recording means and said pick-up member.

2. The apparatus of claim 1 wherein said extended path is in the form of a continuous loop, said recording means and said pick-up member being spaced apart on said loop path a distance equal to half the length of said loop path, and an eraser means on the side of said path moving from said pick-up member to said recording means adapted to erase said tape member, said loop being comprised of two equal length segments, one of sensitive record material and the other of nonsensitive material.

3. The apparatus of claim 2 wherein said loop is mounted in circular configuration on a member adapted to be rotated about its center, and said recording means and said pick-up member are spaced diametrically opposed about the circle of said loop.

4. The apparatus of claim 1 wherein said means for recording statements comprises means adapted for automatically receiving and recording successive master and student statements.

References Cited in the file of this patent

UNITED STATES PATENTS

| 2,209,157 | Glunt | July 23, 1940 |
| 2,561,698 | Hogan | July 24, 1951 |
| 2,764,639 | Holt | Sept. 25, 1956 |
| 2,876,561 | Horne | Mar. 10, 1959 |

FOREIGN PATENTS

| 730,664 | Great Britain | May 25, 1955 |
| 771,104 | Great Britain | Oct. 6, 1955 |